US007244538B2

(12) United States Patent
Sakata et al.

(10) Patent No.: US 7,244,538 B2
(45) Date of Patent: Jul. 17, 2007

(54) BINDER RESIN FOR TONER AND TONERS

(75) Inventors: Kazuya Sakata, Sodegaura (JP); Takeshi Yoshida, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 358 days.

(21) Appl. No.: 10/515,313

(22) PCT Filed: Aug. 8, 2003

(86) PCT No.: PCT/JP03/10165

§ 371 (c)(1), (2), (4) Date: Nov. 23, 2004

(87) PCT Pub. No.: WO2004/015498

PCT Pub. Date: Feb. 19, 2004

(65) Prior Publication Data

US 2005/0208410 A1 Sep. 22, 2005

(30) Foreign Application Priority Data

Aug. 8, 2002 (JP) ............................. 2002-232002

(51) Int. Cl.

*C03G 9/087* (2006.01)
*C08F 8/08* (2006.01)
*C08L 33/00* (2006.01)
*C08L 33/08* (2006.01)
*C08L 25/08* (2006.01)

(52) U.S. Cl. ............................... 430/109.1; 430/109.2; 430/109.3; 430/111.4; 525/107; 525/208; 525/221; 525/241

(58) Field of Classification Search ............. 430/109.1, 430/109.2, 109.3; 525/107, 208

See application file for complete search history.

(56) References Cited

U.S. PATENT DOCUMENTS 4,340,660 A 7/1982 Kiuchi et al.
4,908,290 A * 3/1990 Watanabe et al. ........ 430/109.2
4,966,829 A 10/1990 Yasuda et al.

FOREIGN PATENT DOCUMENTS

JP 60-36582 B2 8/1985
JP 60-38700 B2 9/1985
JP 7-120972 A 5/1995
JP 9-244295 A 9/1997
JP 2000-81729 A 3/2000
JP 2000-81730 A 3/2000
JP 2001-188383 A 7/2001
JP 2002-23417 A 1/2002
JP 2002-148864 A 5/2002

* cited by examiner

*Primary Examiner*—Randy Gulakowski
*Assistant Examiner*—John J. Figueroa
(74) *Attorney, Agent, or Firm*—Buchanan Ingersoll & Rooney PC

(57) ABSTRACT

The present invention was investigated for the purpose of providing a binder resin for toner which is excellent in the low temperature fixing property which can cope with the development of high-speed copier machines, and is excellent in the offset resistance, blocking resistance, pulverizability and development durability.

As a result, it was found that the purpose could be achieved by using, as a binder resin for toner, a resin that can be obtained from at least three different vinyl polymers with different molecular weight, contents of functional groups, and preferably from a crosslinking agent having the vinyl polymer structure, and that contains a specific gel component. This resin has excellent melting property at low temperatures, and has suitable performance as a material for toner and a toner in high-speed copier machines.

3 Claims, No Drawings

BINDER RESIN FOR TONER AND TONERS

TECHNICAL FIELD

The present invention relates to a binder resin for a toner used in electrophotography, electrostatic recording and electrostatic printing, and a toner using the binder resin for toner. More particularly, the present invention relates to a binder resin for toner and a toner that can cope with high-speed copier machines.

BACKGROUND ART

In general, the process of electrophotography in the copiers and printers for Plain Paper Copy (PPC) in which a toner image formed on a photoconductor is transferred onto recording paper, involves first the formation of a latent electrostatic image on the photoconductor, subsequent development of this latent image by means of toner, transfer of this toner image onto a sheet to be fixed, for example, a sheet of paper, and then hot fixing the image with a heat roller. As it allows fixing under high temperature and high pressure, this process is fast and very good in the heating efficiency, and thus very good in the fixing efficiency. However, in such a heat-roll fixing method, while the heating efficiency is good, there is a problem (of the offset phenomenon) in which the contact between the heat roller surface and the toner in a molten state results in the toner adhering and being transferred onto the surface of the heat roller, which is re-transferred onto the next sheet to be fixed, thus making the sheet contaminated. A way of preventing such offset phenomenon includes, for example, application of an anti-offset liquid such as silicone oil onto the surface of the heat roller with clothes or paper. This method is very effective in view of preventing the offset phenomenon of the toner, but requires another extra device for supplying the anti-offset liquid, which leads to complication of the machine design, and it is criticized for causing an increase in the cost, increased maintenance of the machine, complication in the maintenance, contamination within the machine due to the evaporation of said liquid. Accordingly, development of a toner for high-speed machines (oil-less fixing method) used in a method that does not require such application of silicone oil (oil-less fixing method), is on demand.

Meanwhile, there is a demand for high-speed copier machines from the market and thus a toner that is compatible with a high-speed fixing roller, that is, capable of fixing by heating in a short time is demanded. This is considered as an important performance capable of coping with energy saving. In order for the fixing to be done in the shortest possible time, the toner needs to melt at low temperatures and to be highly fluent. For this, it is effective in general to lower the glass transition temperature (hereinafter, referred to as "Tg") of the resin used in the toner; however, there is a problem of the toner undergoing so-called "blocking" during storage.

For the anti-offset processes in the development of a toner for the oil-less fixing method, toners using crosslinked polymers are often suggested. For example, Japanese Examined Patent Application Publication No. 60-36582 or the like discloses a method of using crosslinked polymer that is prepared by emulsion polymerization. In this case, the crosslinked polymer used contains 50 to 99% by mass of a gel component. As this gel component increases in amounts, the offset resistance becomes better, but the pulverizabiliy becomes poor. Meanwhile, as the crosslinked polymer component is reduced, pulverizability becomes better, but the offset resistance becomes poor, and it is difficult to satisfy both of the offset resistance and pulverizability. Further, in, this method (emulsion polymerization), it is necessary to use a dispersing agent or a dispersing aid in combination during the preparation of the crosslinked polymer, in order to stabilize the emulsion particles. Since such a dispersing agent is likely to absorb the moisture, it sometimes has adverse effects on the electrical properties, especially the charge stability. Therefore, it is necessary to remove the dispersing agents as much as possible after the preparation of the crosslinked polymer. Removal of them would be effective mainly with washing the polymer with water in an industrial scale; however, since the efficiency of washing is not always sufficient, in addition to the cost of installation, there are problems such as requiring huge quantities of washing water and increase in the cost of drainage.

In the publication of U.S. Pat. No. 4,966,829, disclosed is a good toner which contains a vinyl-based polymer having 0.1 to 60% by mass of the gel component, with the molecular weight of the main peak in GPC of the tetrahydrofuran (THF)-soluble component being 1000 to 25000 and the molecular weight of the sub-peak or the shoulder being 3000 to 150000. However, the process for preparing the polymer is the suspension polymerization method, and in this case, too, like the emulsion polymerization case, a dispersing agent or a dispersing aid is used in combination in the preparation, having entirely the same problems as in the case of the emulsion polymerization.

Meanwhile, in the solution polymerization method, there is a need to remove the solvent, after the completion of polymerization, by the so-called flash process in which the reaction solution is subjected to a reduced pressure, for example. In this case, since it is possible to seclude the low-volatile components such as unreacted residual monomers or decomposition products of the initiator, the impurities content is very low and charge-stable, and moreover, homogeneous resin can be obtained. For this reason, it is considered to be suitable as the method of preparing a binder resin for toner. However, preparation of a crosslinked polymer by the solution polymerization was associated with a problem of having the so-called Weisenberg phenomenon in which the reaction solution clings to the stirrer bar as the polymerization reaction proceeds.

Japanese Examined Patent Application Publication No. 60-38700 discloses a good toner binder prepared by heating and mixing a polymer (A) containing 3 to 40% by mass of a glycidyl group-containing monomer and a crosslinkable compound (B). However, since this toner comprised large quantities of residual epoxy radicals, testing for a long-term period caused generation of a toner of reverse charge, and there was a problem about durability.

As described in the above, an electrophotographic toner binder or toner that is excellent in the (low temperature) fixing property, offset resistance, blocking resistance, pulverizability, development durability or the like, which can cope with high-speed copier machines or energy saving, has not been known until now.

DISCLOSURE OF INVENTION

Hence, the present invention was achieved under an object of developing a toner which can cope with high-speed copier machines or energy saving, that is to say, which realizes even further lowering of the temperature capable of fixing and is also excellent in the offset resistance. Moreover, another object of the present invention is to provide a toner that is excellent in the fixing property and offset resistance, as well as the blocking resistance, pulverizability and development durability.

The inventors of the present invention have conducted an extensive investigation to solve the above-described problems and completed the invention.

The first aspect of the present invention is a binder resin for toner that can be obtained from a crosslinking agent (A) having an epoxy equivalent of 1,000 to 30,000 and a vinyl polymer (B) satisfying the following requirements (I) to (VI), contain 0.1 to 50% by mass of a gel component, and have a glass transition temperature of 45 to 75° C.:

(I) vinyl polymer (B) consists of vinyl polymer (H) and vinyl polymer (L);

(II) vinyl polymer (L) consists of vinyl polymer (L1) which has a weight-average molecular weight in the range between 4,000 and 50,000, as measured by gel permeation chromatography (GPC) and contains 0 to 0.02 mol of a functional group selected from OH, COOH, acid anhydride and amino per kg of the resin, and of vinyl polymer (L2) which has a weight average molecular weight in the range between 4,000 and 50,000 and contains 0.05 to 0.65 mol of a functional group selected from OH, COOH, acid anhydride and amino per kg of the resin;

(III) vinyl polymer (H) has a weight-average molecular weight in the range between 50,000 and 1,000,000 and contains 0.02 to 0.60 mol of a functional group selected from OH, COOH, acid anhydride and amino per kg of the resin;

(IV) the mass ratio of vinyl polymer (L1)/vinyl polymer (L2) is 5/95 to 95/5;

(V) the mass ratio of vinyl polymer (H)/vinyl polymer (L) is 5/95 to 40/60; and (VI) the molecular weight and/or the content of the functional group of vinyl polymer (H) is (are) different from those of vinyl polymer (L1) and of vinyl polymer (L2).

The second aspect of the present invention is a binder resin for toner characterized in that vinyl polymer (B) is a styrene acryl-based resin.

The third aspect of the present invention is a toner characterized in containing the above-described binder resin for toner.

The binder resin for toner and the toner using the same according to the present invention realize an excellent low temperature fixing property while having excellent blocking resistance, pulverizability and development durability in addition to the offset resistance, and thus they are industrially valuable.

BEST MODE FOR CARRYING OUT THE INVENTION

Now, the binder resin for toner and the toner according to the present invention will be described in detail. In the context of the present invention, the term polymerization may occasionally denote copolymerization, and the term polymer may occasionally denote copolymer. First, the binder resin for toner of the present invention will be described.

The binder resin for toner of the present invention can be obtained from crosslinking agent (A) and vinyl polymer (B) having a functional group selected from OH, COOH, acid anhydride and amino.

Crosslinking agent (A) used in the present invention comprises a group having the epoxy structure and undergoes a crosslinking reaction with vinyl polymer (B) which will be described later. As the group having the epoxy structure, a glycidyl group is very suitable upon consideration of factors such as reactivity, availability and prices. The epoxy equivalent of crosslinking agent (A) according to the present invention is preferably in the range of 1,000 to 30,000 g/eq, and more preferably of 1,000 to 20,000 g/eq. If the epoxy equivalent is greater than 30,000, the amount of gel generation is small, causing the offset resistance to be insufficient. On the other hand, the epoxy equivalent is less than 1,000, the breakage of gel during the toner preparation process in spite of crosslinking, there may be a problem of development durability.

Further, crosslinking agent (A) preferably has the structure of a vinyl polymer.

The glycidyl group-containing vinyl polymer (A1) which is particularly preferably used as crosslinking agent (A) in the present invention, is typically obtained by polymerizing a monomer having a polymerizable double bond and a monomer having a glycidyl group and a polymerizable double bond.

As the monomer having a polymerizable double bond, mention may be specifically made of styrenes such as styrene, p-methyl styrene, α-methyl styrene and vinyl toluene; acrylic esters such as methyl acrylate, ethyl acrylate, propyl acrylate, butyl acrylate, octyl acrylate, cyclohexyl acrylate, stearyl acrylate, benzyl acrylate, furfuryl acrylate, hydroxyethyl acrylate, hydroxybutyl acrylate, dimethylaminomethyl acrylate and dimethylaminoethyl acrylate; methacrylic esters such as methyl methacrylate, ethyl methacrylate, propyl methacrylate, butyl methacrylate, octyl methacrylate, cyclohexyl methacrylate, stearyl methacrylate, benzyl methacrylate, furfuryl methacrylate, hydroxyethyl methacrylate, hydroxybutyl methacrylate, dimethylaminomethyl methacrylate and dimethylaminoethyl methacrylate; diesters of unsaturated dibasic acids such as dimethyl fumarate, dibutyl fumarate, dioctyl fumarate, dimethyl maleate, dibutyl maleate and dioctyl maleate; and amides such as acrylonitrile, methacrylonitrile, acrylamide, methacrylamide, N-substituted acrylamide and N-substituted methacrylamide. Among these, particularly preferred vinyl monomers include styrenes, acrylic esters, methacrylic esters, dialkylesters of fumaric acid, acrylonitrile, acrylamide, and methacrylamide.

The above compound may be used in combination of two or more species.

Meanwhile, the monomers containing a glycidyl group and a polymerizable double-bond specifically include glycidyl acrylate, methylglycidyl β acrylate, glydicyl methacryltic acid and methylglycidyl β methacrylate, and the preferred monomers are glycidyl methacrylate and methylglycidyl β methacrylate.

As the method for polymerizing these compounds, no particular limitation is given, and use may be made of suspension polymerization, emulsion polymerization, bulk polymerization, solution polymerization, or the like. In particular, bulk polymerization and solution polymerization are preferred for the same reason.

In the solution polymerization that is preferably used in the present invention, as solvent, aromatic hydrocarbons such as benzene, toluene, ethylbenzene, ortho-xylene, meta-xylene, para-xylene and cumene are preferably used, alone or in combination of two or more species. It is also possible to select other solvents to control the molecular weight.

Polymerization may be carried out using a polymerization initiator, or by so-called thermal polymerization without using a polymerization initiator. Any polymerization initiator that can be conventionally used as the radical polymerization initiator may all be used, and examples include azo-based initiator such as 2,2'-azobisisobutyronitrile, 2,2'- azobis(4-methoxy-2,4-dimethylvaleronitrile), dimethyl-2, 2'-azobisisobutyrate, 1,1'-azobis(1-cyclohexanecarbonitrile), 2-(carbamoylazo)-isobutyronitrile, 2,2'-azobis(2,4,4,-trimethylpentane), 2-phenylazo-2,4-dimethyl-4-methoxyvaleronitrile and 2,2'-azobis(2-methyl-propane); ketone peroxides such as methylethylketone peroxide, acetylacetone peroxide and cyclohexanone peroxide; peroxy ketals such as 1,1-bis(t-butylperoxy)-3,3,5-trimethyl cyclohexane, 1,1-bis(butylperoxy)cyclohexane and 2,2-bis(t-butylperoxy)butane; hydroperoxides such as t-butyl hyroperoxide, cumene hydroperoxide and 1,1,3,3-tetramethylbutyl hydroperoxide; dialkyl peroxides such as di-t-butyl peroxide, t-butylcumyl peroxide, dicumyl peroxide, 2,5-dimethyl-2,5-di(t-butylperoxy)hexane and α,α'-bis(t-butylperoxy isopropyl)benzene; diacyl peroxides such as isobutyryl peroxide, octanoyl peroxide, decanoyl peroxide, lauroyl peroxide, 3,5,5-trimethylhexanoyl peroxide, benzoyl peroxide and m-toluoyl peroxide; peroxydicarbonates such as diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate and di(3-methyl-3-methoxybutyl)peroxycarbonate; sulfonyl peroxides such as acethylcyclohexyl sulfonylperoxide; peroxyesters such as t-butyl peroxyacetate, t-butyl peroxyisobutyrate, t-butyl peroxyneodecanoate, cumyl peroxyneodecanoate, t-butylperoxy 2-ethylhexanoate, t-butyl peroxylaurate, t-butyl peroxybenzoate, t-butyl peroxyisopropylcarbonate and di-t-butyl diperoxyisophthalate. These initiators may be used alone or in combination of two or more species. The type and amount of the initiator may be appropriately selected for use, depending on the reaction temperature, monomer concentration or the like, and typically, 0.01 to 10 parts by mass is used per 100 parts by mass of the monomer used.

The crosslinking agent (A) of the present invention is preferably a crosslinking agent having the structure of, in particular, styrene-acrylic resin, in view of the freedom of reaction control or property design, cost or the like.

The vinyl polymer (B) used in the present invention consists of vinyl polymer (H) and vinyl polymer (L) which will be described later. Moreover, vinyl polymer (L) consists of vinyl polymer (L1) and vinyl polymer (L2).

Vinyl polymer (B) according to the present invention is preferably obtained by polymerizing the compound having a polymerizable double bond as described above, with a monomer optionally having a functional group selected from OH, COOH, acid anhydride and amino, and a polymerizable double bond. The method or conditions for polymerization are identical with those for the above-described crosslinking agent (A).

As the monomer having a functional group selected from OH, COOH, acid anhydride and amino, and a polymerizable double bond as described above, specifically those compounds as described below may be mentioned.

That is to say, a monomer having a COOH group or an acid anhydride group may be exemplified by unsaturated dibasic acids and monoesters thereof such as acrylic acid, methacrylic acid, maleic acid, fumaric acid, cinnamic acid, monomethyl fumarate, monoethyl fumarate, monopropyl fumarate, monobutyl fumarate, monooctyl fumarate, monomethyl maleate, monoethyl maleate, monopropyl maleate, monobutyl maleate and monooctyl maleate, and preferred are acrylic acid, methacrylic acid, fumaric acid, monomethyl fumarate, monoethyl fumarate, monopropyl fumarate, monobutyl fumarate, monooctyl fumarate, maleic anhydride, itaconic anhydride, or the like.

Further, a monomer comprising an OH group may be exemplified by the above-described carboxylic acids or acid anhydrides as well as their monoesters with polyhydric alcohols as described below. That is, these polyhydric alcohols include alkyl diols such as ethylene glycol, 1,2-propylene glycol, 1,3-propylene glycol, 1,3-butylene glycol, 1,4-butylene glycol, 2,3-butanediol, diethylene glycol, triethylene glycol, dipropylene glycol, 1,5-pentanediol, 1,6-hexanediol, neopentyl glycol and 2-ethyl-1,3-hexanediol; hydrogenated bisphenol A; alicyclic diols such as cyclohexanedimethanol; bisphenol F, bisphenol S and their derivatives; alkylene oxides that are the reaction products of ethylene oxide, propylene oxide or the like, with bisphenol F or bisphenol S; or aromatic diols that are lower alcohol ester of dicarboxylic acids such as bishydroxy butylterephthalic acid. Further, mention may be made of, for example, esters or adducts of the carboxylic acids or acid anhydrides and bisphenol A derivatives, such as the adducts of bisphenol A-alkylene oxide including the adducts of bisphenol A-ethylene oxide and the adducts of bisphenol A-propylene oxide. Mention may be also made of esters of the carboxylic acids or acid anhydrides with polyols with a molecular valence of 3 or higher such as glycerin, 2-methylpropanetriol, trimethylolpropane, trimethylolethane, sorbit and sobitan.

As the monomers comprising an amino group, mention may be made of, for example, N-methylamino(meth)acrylate, N-ethylamino(meth)acrylate, N-propylamino(meth) acrylate and N-butylamino(meth)acrylate.

Among these, the monomers having the COOH group are preferably used.

The vinyl polymer (L1) used in the present invention has a weight-average molecular weight ranging between 4,000 and 50,000, preferably 5,000 to 30,000, and more preferably 8,000 to 20,000, and its content of a functional group selected from OH, COOH, acid anhydride and amino is 0 mol to 0.02 mol, preferably 0 to 0.01 mol per kg of resin. This content of the functional group can be replaced by the acid number, if said functional group is a COOH group. In this case, the acid number is preferably from 0 mg KOH/g to 1 mg KOH/g, inclusive, and more preferably 0 mg KOH/g to 0.5 mg KOH/g.

The vinyl polymer (L1) used in the present invention is a component that is virtually non-reactive with crosslinking agent (A). When the weight-average molecular weight is less than 4,000, the offset resistance may be insufficient because the mechanical strength is low, the durability is poor, or the viscosity is low. When the content of the functional group exceeds 0.02 mol per kg of resin, the amount of vinyl polymer (L2) that will be described later, substantially increases, and owing to the increases in the proportion of the crosslinking or gel, and thus increases in viscosity, the fixing property may become poor.

The vinyl polymer (L2) according to the present invention has a weight-average molecular weight of 4,000 to 50,000, preferably 5,000 to 30,000, and more preferably 8,000 to 20,000, and its content of a functional group selected from OH, COOH, acid anhydride and amino is 0.05 mol to 0.65 mol, preferably 0.05 mol to 0.2 mol per kg of resin. In the case where said functional group is a COOH group, the acid number is preferably 3 mg KOH/g to 35 mg KOH/g, more preferably 3 mg KOH/g to 20 mg KOH/g, and even more preferably 4 mg KOH/g to 10 mg KOH/g.

Said vinyl polymer (L2) is a component that mainly reacts with crosslinking agent (A) to attain high molecular weight or to become gelled. When the weight-average molecular weight is 4,000 or less, the offset resistance may be insufficient because the mechanical strength is low, the durability becomes poor, or the viscosity is low. When the content of the functional group is less than 0.05 mol per kg of resin, the amount of vinyl polymer (L1) substantially increases, that is, the amount of the crosslinking component decreases, and subsequently the offset resistance may be insufficient. On the other hand, when the content is greater than 0.65 mole, generation of high molecular weight polymers and gelation take place in an excessive degree, and thus the fixing property and pulverizability become poor.

The vinyl polymer (H) according to the present invention has a weight-average molecular weight in the range between 50,000 and 1,000,000, preferably of 100,000 to 500,000, and more preferably of 150,000 to 400,000, and the content of a functional group selected from OH, COOH, acid anhydride and amino is 0.02 mol to 0.60 mole, preferably 0.02 mol to 0.55 mole, and more preferably 0.05 mol to 0.40 mol per kg of resin. If the functional group is a COOH group, the acid number is preferably 1 mg KOH/g to 30 mg KOH/g, and more preferably 3 mg KOH/g to 20 mg KOH/g.

The vinyl polymer (H) is a component that mainly reacts with crosslinking agent (A) to attain high molecular weight or to become gelled. When the weight-average molecular weight is less than 50,000, durability or the offset resistance may be insufficient. On the other hand, when the weight-average molecular weight is greater than 1,000,000, the fixing property and pulverizability may become poor. When the content of the functional group is less than 0.02 mol per kg of resin, the reaction with crosslinking agent (A) may occur insufficiently, and subsequently the offset resistance may become insufficient. On the other hand, when the content of the functional group is greater than 0.60 mol per kg of resin, the crosslinking reaction occurs excessively, and subsequently the fixing property or pulverizability may be lowered.

The vinyl polymer (H) according to the present invention has regions in the ranges of molecular weight or the content of functional group that overlap with those of vinyl polymer (L1) and of vinyl polymer (L2). However, vinyl polymer (H) is selected to avoid the ranges of molecular weight and/or the content of functional group that overlap with those of vinyl polymer (L1) and of vinyl polymer (L2). Preferably, the vinyl polymer (H) used in the present invention is of higher molecular weight compared with vinyl polymer (L1) and with vinyl polymer (L2).

The vinyl-based polymer (L1) and vinyl-based polymer (L2) used in the present invention are used in the mass ratio of L1/L2 ranging from 5/95 to 95/5. Preferably, the ratio is 20/60 to 60/20. When vinyl polymer (L1) is used in a proportion lower than said range of ratio, the reactivity with crosslinking agent (A) increases, and thus the viscosity increases too much, causing poor fixing property. On the other hand, when the proportion of vinyl polymer (L1) is greater than said range, the reactivity decreases, and thus the offset resistance may be insufficient.

In the present invention, the mass ratio of the vinyl-based polymer (H) to the vinyl-based polymer (L), H/L, is 5/95 to 40/60, preferably 10/90 to 35/65. When vinyl polymer (H) is used in a proportion lower than the range of ratio, the viscosity is too low, and thus the offset resistance may be insufficient. On the other hand, when vinyl polymer (H) is used in a proportion greater than the range, the viscosity is too high, and thus the fixing property may be insufficient.

In the present invention, the mass ratio of vinyl polymer (B) to crosslinking agent (A), B/A, is preferably 98/2 to 85/15. When the proportion of vinyl polymer (B) is greater than the range of ratio, the reactivity with crosslinking agent (A) becomes too low, and sufficient crosslinking does not occur, and thus the offset resistance may be insufficient. On the other hand, when the proportion of crosslinking agent (A) is greater than the range, the reactivity with vinyl polymer (B) becomes too high, and fluidity becomes poor, and thus the fixing property may be insufficient.

The vinyl polymer (B) of the present invention preferably has the structure of, in particular, a styrene-acrylic resin in view of the freedom of reaction control or property designs, cost, and the like.

The number-average molecular weight (Mn) or the weight-average molecular weight (Mw) according to the present invention, which is measured by GPC (gel permeation chromatography) is the molecular weight calculated from the calibration curve established by means of standard monodisperse polystyrene. The conditions of measurement are as follows.

GPC equipment: JASCO TWINCLE HPLC

Detector: SHODEX RI SE-31

Column: SHODEX GPCA-80M column×2 and KF-802 column×1 (connected in series)

Solvent: tetrahydrofuran (THF)

Flow rate: 1.2 ml/min

The binder resin for toner according to the present invention comprises a resin obtained from crosslinking agent (A) and vinyl polymer (B). A method of reacting crosslinking agent (A) with vinyl polymer (B) may be preferably exemplified by the method in which crosslinking agent (A) and vinyl polymer (B) are melted and kneaded, and then reacted. For the hot melting, any conventionally known method may be employed, but particularly preferred is the method of using a double-screw kneader. It can be specifically exemplified by the following method: vinyl polymer (B) and crosslinking agent (A) are mixed in a Henschel mixer or the like, and then the mixture is melted and kneaded by means of a double-screw kneader, and subsequently reacted. The temperature used in the melting, kneading and reaction processes may vary depending on the type of the crosslinking agent (A) or the vinyl polymer (B), but it is in the range of 100° C. to 240° C., and preferably of 150° C. to 220° C. In addition to said double-screw kneader, a reaction vessel equipped with a stirrer may also be used.

Thus obtained resin is cooled and pulverized to be used as a binder resin for toner. Any known method in the art may be used for the processes of cooling and pulverization, although quenching by means of a steel belt cooler or the like may be used for cooling.

The content of the gel component in the binder resin for toner according to the present invention is 0.1 to 50% by mass, preferably 0.1 to 30% by mass, and more preferably 1 to 20% by mass, in the aspects of the offset resistance and fixing property.

The gel component according to the present invention is defined with the values measured as in the following. That is, 2.5 g of the resin and 47.5 g of ethyl acetate are introduced in a 100-ml sample tube, this sample tube is stirred at 50 rpm, at 22° C. for 12 hours, and then settled at 22° C. for 12 hours. After settling, 5 g of the supernatant from the sample tube is dried at 150° C. for 1 hour, and the mass of the residue (X g) is measured to calculate the content of the gel component based on the equation below:

$$\text{Content of Gel component (\% by mass)}=[(2.5/50-X/5)/(2.5/50)]\times 100$$

In the present invention, the acid number was obtained by the following procedure:

To a solvent mixture of xylene:n-butanol=1:1 (by mass), a precisely weighed amount of sample is dissolved and is titrated with previously graded a N/10 potassium hydroxide solution in alcohol (5 g of ion-exchanged water is added to 7 g of guaranteed potassium hydroxide, the solution is made to 1 liter with guaranteed ethyl alcohol, and the solution is titrated with a solution of N/10 hydrochloric acid and 1% phenolphthalein to obtain the titer=F). The neutralization titer is used in calculating the acid number from the following equation:

$$\text{Acid number (mg KOH/g)}=(N/10\ \text{KOH titer (ml)}\times F\times 5.61)/(\text{g of sample}\times 0.01)$$

Also, the content of the ethyl acetate-soluble component contained in the gel component is less than or equal to 1% by mass.

The binder resin for toner of the present invention may comprise, if necessary, the resins or waxes that are used in the preparation of toner that will be described later. The content in total is preferably 0 to 10% by mass.

The glass transition temperature (Tg) of the binder resin for toner according to the present invention, as obtained by the standards of JIS K-7121, is 45 to 75° C., preferably 50 to 60° C. With Tg less than 45° C., the blocking resistance may be insufficient; and with Tg greater than 75° C., the fixing property may be insufficient.

The toner of the present invention can be obtained by any process known in the art using a binder resin for toner, colorant, and if necessary, charge controlling agent, mold releasing agent, pigment dispersing agent or the like. For colorant, mention may be made, for example, of black pigments such as carbon black, acetylene black, lamp black, magnetite or the like, and of known organic pigments such as chrome yellow, yellow iron oxide, Hanza yellow G, quinoline yellow lake, permanent yellow NCG, molybdenum orange, Balkan orange, indantrene, brilliant orange GK, bengala (red oxide), brilliant carmine 6B, alizarine lake, methyl violet lake, fast violet B, cobalt blue, alkali blue lake, phthalocyanine blue, fast sky blue, pigment green B, Malakite green lake, titanium oxide, zinc oxide or the like. The content is 5 to 250 parts with respect to 100 parts by mass of the binder resin for toner.

Use may also be made of, as required and within the scope not impairing the effect of the present invention, for example, polyvinyl chloride, polyvinyl acetate, polyolefin, polyester, polyvinyl butyral, polyurethane, polyamide, rosin, modified rosin, terpene resin, phenolic resin, aliphatic hydrocarbon resin, aromatic petroleum resin, paraffin wax, polyolefin wax, aliphatic amide wax, vinyl chloride resin, styrene-butadiene resin, Coumarone-Indene resin, melamine resin or the like. Further, any known charge controlling agent as well as nigrosin, quaternary ammonium salts or metal-containing azo dyes may be appropriately selected and used. The amount of use thereof in total is 0 to 10 parts by mass, preferably 0.1 to 10 parts by mass with respect to 100 parts by mass of the binder resin.

According to the present invention, as the method of preparing the toner, any conventionally known method may be employed. For example, resin, colorant, charge controlling agent, wax and the like are premixed in advance, and then the mixture is heated and kneaded using a double-screw kneader to a molten state. After cooling this, the product is micropulverized using a micropulverizer and then classified using a pneumatic classifier, and particles of a typical size in the range of 8 to 20μ are collected to be used in the toner. Here, for the conditions for heating and melting in the double-screw kneader, it is particularly preferred, in view of the thermal resistance of the binder resin for toner, the ceiling temperature, the handling, or the like that the resin temperature at the outlet of the double-screw kneader is lower than 165° C. and the residence time is less than 180 seconds. It is also preferred, for a cooling method, to cool rapidly using a steel belt cooler or the like.

The electrophotographic toner thus obtained by the above contains at least 50% by mass, preferably 60% by mass of the resin obtained from the crosslinking agent (A) and vinyl polymer (B) of the present invention. There is no upper limit in particular, and the content may be adjusted depending on the purpose, even a content of 90 to 100% by mass being possibly used.

The toner according to the present invention has the constitution as described in the above and thus has excellent low temperature fixing property as well as excellent offset resistance. In addition to that, the toner is excellent in the blocking resistance, pulverizability and development durability, having the desirable performance as the toner for high-speed copier machines. Further, the excellent low temperature fixing property can contribute to the social trend of energy saving.

EXAMPLES

Now, the present invention will be specifically illustrated by the following Examples, which are not intended to limit the present invention. Also, the term "parts" represents parts by mass unless indicated otherwise.

Preparative Examples for Crosslinking Agent (A)

Preparative Example A-1

75 parts of xylene was placed in a flask purged with nitrogen and subjected to temperature elevation. Under a reflux of xylene, a previously mixed solution of 65 parts of styrene, 30 parts of n-butyl acrylate, 5 parts of glycidyl methacrylate and 1 part of di-t-butyl peroxide was continuously added over 5 hours, and it was kept under reflux for another 1 hour. The internal temperature was then maintained at 130° C., 0.5 part of di-t-butyl peroxide was further added, and the reaction was continued for 2 hours. Then, di-t-butyl peroxide was added again in an amount of 0.5% by mass of the total amount of styrene, n-butyl acrylate and glycidyl methacrylate, and the mixture was maintained for another 2 hours to complete the reaction and to obtain a polymerization solution. This was subjected to flashing in a vessel at 160° C. and 1.33 kPa to remove the solvent and the like, and resin A-1 was obtained. Its property values are summarized in Table 1.

TABLE 1

| | Example 1 | Example 2 | Example 3 | Example 4 | Example 5 | Example 6 | Example 7 |
|---|---|---|---|---|---|---|---|
| Resin A (Crosslinking agent) | A-1 | A-1 | A-1 | A-1 | A-1 | A-1 | A-1 |
| Resin B (Vinyl polymer) | B-1 | B-2 | B-3 | B-4 | B-5 | B-6 | B-7 |
| Mass ratio (B/A) | 93/7 | 93/7 | 93/7 | 93/7 | 93/7 | 93/7 | 93/7 |
| Resin A Epoxy equivalent (g/eq) | 4300 | 4300 | 4300 | 4300 | 4300 | 4300 | 4300 |
| Resin A Weight-average molecular weight | 50000 | 50000 | 50000 | 50000 | 50000 | 50000 | 50000 |
| L1 Weight-average molecular weight | 12000 | 4000 | 50000 | 12000 | 12000 | 12000 | 12000 |
| L1 Functional group Content (mol/kg) | 0 | 0 | 0 | 0.02 | 0 | 0 | 0 |
| L1 Acid number (mgKOH/g) | 0 | 0 | 0 | 1 | 0 | 0 | 0 |
| L2 Weight-average molecular weight | 12000 | 12000 | 12000 | 12000 | 4000 | 50000 | 12000 |
| L2 Functional group Content (mol/kg) | 0.12 | 0.12 | 0.12 | 0.12 | 0.12 | 0.12 | 0.05 |
| L2 Acid number (mgKOH/g) | 6.5 | 6.5 | 6.5 | 6.5 | 6.5 | 6.5 | 3 |
| H Weight-average molecular weight | 300000 | 300000 | 300000 | 300000 | 300000 | 300000 | 300000 |
| H Functional group Content (mol/kg) | 0.29 | 0.29 | 0.29 | 0.29 | 0.29 | 0.29 | 0.29 |
| H Acid number (mgKOH/g) | 16.5 | 16.5 | 16.5 | 16.5 | 16.5 | 16.5 | 16.5 |
| Mass ratio (L1/L2) | 40/40 | 40/40 | 40/40 | 40/40 | 40/40 | 40/40 | 40/40 |
| Mass ratio (H/(L1 + L2)) | 20/80 | 20/80 | 20/80 | 20/80 | 20/80 | 20/80 | 20/80 |
| Gel content (% by mass) | 10 | 10 | 10 | 10 | 10 | 10 | 10 |
| Tg (° C.) | 58 | 58 | 58 | 58 | 58 | 58 | 58 |
| Fixing property | 1 | 1 | 2 | 2 | 1 | 2 | 1 |
| Offset resistance | 1 | 2 | 1 | 1 | 2 | 1 | 2 |
| Blocking resistance | 1 | 1 | 1 | 1 | 1 | 1 | 1 |
| Pulverizability | 1 | 1 | 2 | 1 | 1 | 2 | 1 |
| Development durability | 1 | 2 | 1 | 2 | 2 | 1 | 1 |

Preparative Example A-2

Resin A-2 was obtained by the same procedure as in Preparative Example A-1 except that 0.65 part of glycidyl methacrylate was used instead of 5 parts. Its property values are summarized in Table 3.

Preparative Example A-3

Resin A-3 was obtained by the same procedure as in Preparative Example A-1 except that 13 parts of glycidyl methacrylate was used instead of 5 parts. Its property values are summarized in Table 3.

Preparative Example A-4

Resin A-4 was obtained by the same procedure as in Preparative Example A-1 except that 0.39 part of glycidyl methacrylate was used instead of 5 parts. Its property values are summarized in Table 6.

Preparative Example A-5

Resin A-5 was obtained by the same procedure as in Preparative Example A-1 except that 19.5 parts of glycidyl methacrylate was used instead of 5 parts. Its property values are summarized in Table 6.

Preparative Examples for Vinyl Polymer (B)

Preparative Example B-1

75 parts of xylene was placed in a flask purged with nitrogen and subjected to temperature elevation. Under a reflux of xylene, a previously mixed solution of 83 parts of styrene, 17 parts of n-butyl acrylate and 3 part of di-t-butyl peroxide was continuously added over 5 hours, and it was kept under reflux for another 1 hour. The internal temperature was then maintained at 130° C., and then 1,1-bis(t-butylperoxy)-3,3,5-trimethylcyclohexane was further added in an amount of 0.2% by mass of the total amount of styrene, n-butyl acrylate and methacrylic acid, and the mixture was maintained for another 2 hours to continue the reaction. Then, 1,1-bis(t-butylperoxy)-3,3,5-trimethylcyclohexane was further added in an amount of 0.5% by mass of the total amount of styrene, n-butyl acrylate and methacrylic acid, and the mixture was maintained for another 2 hours to complete the reaction and to obtain a polymerization solution (L1). Additionally, 75 parts of xylene was placed in a flask purged with nitrogen and subjected to temperature elevation. Under a reflux of xylene, a previously mixed solution of 82 parts of styrene, 17 parts of n-butyl acrylate, 1.0 part of methacrylic acid and 3 part of di-t-butyl peroxide was continuously added over 5 hours, and it was kept under reflux for another 1 hour. The internal temperature was then maintained at 130° C., and then 1,1-bis(t-butylperoxy)-3,3, 5-trimethylcyclohexane was further added in an amount of 0.2% by mass of the total amount of styrene, n-butyl acrylate and methacrylic acid, and the mixture was maintained for another 2 hours to continue the reaction. Then, 1,1-bis(t-butylperoxy)-3,3,5-trimethylcyclohexane was further added in an amount of 0.5% by mass of the total amount of styrene, n-butyl acrylate and methacrylic acid, and the mixture was maintained for another 2 hours to complete the reaction and to obtain a polymerization solution (L2).

Separately, as a vinyl monomer, 75 parts of styrene, 23.5 parts of n-butyl acrylate and 2.5 parts of methacrylic acid were placed in a flask purged with nitrogen and was subjected to temperature elevation to an internal temperature of 120° C. Then, the product was kept under the same temperature and bulk polymerization was carried out for 10 hours. The degree of polymerization was 51%. Then, 50 parts of xylene was added, and a previously mixed solution comprising 0.1 part of dibutyl peroxide and 50 parts of xylene was continuously added over 8 hours at 130° C. Further, 1,1-bis(t-butylperoxy)-3,3,5-trimethylcyclohexane was further added in an amount of 0.2% by mass of the total amount of styrene, n-butyl acrylate and methacrylic acid, and the mixture was maintained for another 2 hours to complete polymerization and to obtain a high molecular weight polymerization solution (H).

Next, 80 parts of the low molecular weight solution (L1+L2) comprising a mixture of 50 parts of said low molecular weight polymerization solution (L1) and 50 parts of said low molecular weight of polymerization solution (L2), was mixed with 20 parts of the high molecular weight polymerization solution (H), and this was subjected to flashing in a vessel at 190° C. and 1.33 kPa to remove the solvent and the like, and resin B-1 was obtained. Its property values are summarized in Table 1.

Preparative Example B-2

Resin B-2 was obtained by the same procedure as in Preparative Example B-1 except that 9.5 parts of di-t-butyl peroxide was used during the preparation of the low molecular weight polymerization solution (L1). Its property values are summarized in Table 1.

Preparative Example B-3

Resin B-3 was obtained by the same procedure as in Preparative Example B-1 except that 0.5 parts of di-t-butyl peroxide was used during the preparation of the low molecular weight polymerization solution (L1). Its property values are summarized in Table 1.

Preparative Example B-4

Resin B-4 was obtained by the same procedure as in Preparative Example B-1 except that 82.9 parts of styrene, 17 parts of n-butyl acrylate and 0.1 part of methacrylic acid were used during the preparation of the low molecular weight polymerization solution (L1) instead of 83 parts of styrene and 17 parts of n-butyl acrylate. Its property values are summarized in Table 1.

Preparative Example B-5

Resin B-5 was obtained by the same procedure as in Preparative Example B-1 except that 9.5 parts of di-t-butyl peroxide was used during preparation of the low molecular weight polymerization solution (L2). Its property values are summarized in Table 1.

Preparative Example B-6

Resin B-6 was obtained by the same procedure as in Preparative Example B-1 except that 0.5 parts of di-t-butyl peroxide was used during preparation of the low molecular weight polymerization solution (L2). Its property values are summarized in Table 1.

Preparative Example B-7

Resin B-7 was obtained by the same procedure as in Preparative Example B-1 except that 83.5 parts of styrene, 17 parts of n-butyl acrylate and 0.5 part of methacrylic acid were used during the preparation of the low molecular weight polymerization solution (L2) instead of 82 parts of styrene, 17 parts of n-butyl acrylate and 1.0 part of methacrylic acid. Its property values are summarized in Table 1.

Preparative Example B-8

Resin B-8 was obtained by the same procedure as in Preparative Example B-1 except that 77.6 parts of styrene, 17 parts of n-butyl acrylate and 5.4 parts of methacrylic acid were used during the preparation of the low molecular weight polymerization solution (L2) instead of 82 parts of styrene, 17 parts of n-butyl acrylate and 1.0 part of methacrylic acid. Its property values are summarized in Table 2.

Preparative Example B-9

Resin B-9 was obtained by the same procedure as in Preparative Example B-1 except that the procedure as described below was used during preparation of the high molecular weight polymerization solution (H). Its property values are summarized in Table 2.

75 parts of xylene was placed in a flask purged with nitrogen and subjected to temperature elevation. Under a reflux of xylene, a previously mixed solution of 75 parts of styrene, 23.5 parts of n-butyl acrylate, 2.5 parts of methacrylic acid and 0.5 part of di-t-butyl peroxide was continuously added over 5 hours, and it was kept under reflux for another 1 hour. The internal temperature was then maintained at 130° C., and then 1,1-bis(t-butylperoxy)-3,3,5-trimethylcyclohexane was further added in an amount of 0.2% by mass of the total amount of styrene, n-butyl acrylate and methacrylic acid, and the mixture was maintained for another 2 hours to continue the reaction. Then, 1,1-bis(t-butylperoxy)-3,3,5-trimethylcyclohexane was further added in an amount of 0.5% by mass of the total amount of styrene, n-butyl acrylate and methacrylic acid, and the mixture was maintained for another 2 hours to complete the reaction.

TABLE 2

| | Example 8 | Example 9 | Example 10 | Example 11 | Example 12 | Example 13 | Example 14 |
|---|---|---|---|---|---|---|---|
| Resin A (Crosslinking agent) | A-1 | A-1 | A-1 | A-1 | A-1 | A-1 | A-1 |
| Resin B (Vinyl polymer) | B-8 | B-9 | B-10 | B-11 | B-12 | B-13 | B-14 |
| Mass ratio (B/A) | 93/7 | 93/7 | 93/7 | 93/7 | 93/7 | 93/7 | 93/7 |
| Resin A Epoxy equivalent (g/eq) | 4300 | 4300 | 4300 | 4300 | 4300 | 4300 | 4300 |
| Resin A Weight-average molecular weight | 50000 | 50000 | 50000 | 50000 | 50000 | 50000 | 50000 |
| L1 Weight-average molecular weight | 12000 | 12000 | 12000 | 12000 | 12000 | 12000 | 12000 |
| L1 Functional group Content (mol/kg) | 0 | 0 | 0 | 0 | 0 | 0 | 0 |
| L1 Acid number (mgKOH/g) | 0 | 0 | 0 | 0 | 0 | 0 | 0 |
| L2 Weight-average molecular weight | 12000 | 12000 | 12000 | 12000 | 12000 | 12000 | 12000 |
| L2 Functional group Content (mol/kg) | 0.62 | 0.12 | 0.12 | 0.12 | 0.12 | 0.12 | 0.12 |
| L2 Acid number (mgKOH/g) | 35 | 6.5 | 6.5 | 6.5 | 6.5 | 6.5 | 6.5 |
| H Weight-average molecular weight | 300000 | 50000 | 300000 | 300000 | 300000 | 300000 | 300000 |
| H Functional group Content (mol/kg) | 0.29 | 0.29 | 0.02 | 0.53 | 0.29 | 0.29 | 0.29 |
| H Acid number (mgKOH/g) | 16.5 | 16.5 | 1 | 30 | 16.5 | 16.5 | 16.5 |
| Mass ratio (L1/L2) | 40/40 | 40/40 | 40/40 | 40/40 | 5/95 | 95/5 | 40/40 |
| Mass ratio (H/(L1 + L2)) | 20/80 | 20/80 | 20/80 | 20/80 | 20/80 | 20/80 | 5/95 |
| Gel content (% by mass) | 10 | 10 | 10 | 10 | 10 | 10 | 10 |
| Tg (° C.) | 58 | 58 | 58 | 58 | 58 | 58 | 58 |
| Fixing property | 2 | 2 | 1 | 2 | 2 | 1 | 1 |
| Offset resistance | 1 | 1 | 2 | 2 | 1 | 2 | 2 |
| Blocking resistance | 1 | 1 | 1 | 1 | 1 | 1 | 1 |
| Pulverizability | 1 | 1 | 1 | 1 | 1 | 1 | 1 |
| Development durability | 2 | 2 | 1 | 1 | 1 | 1 | 1 |

Preparative Example B-10

Resin B-10 was obtained by the same procedure as in Preparative Example B-1 except that 76.3 parts of styrene, 23.5 parts of n-butyl acrylate and 0.2 part of methacrylic acid were used during the preparation of the high molecular weight polymerization solution (H) instead of 75 parts of styrene, 23.5 parts of n-butyl acrylate and 2.5 parts of methacrylic acid. Its property values are summarized in Table 2.

Preparative Example B-11

Resin B-11 was obtained by the same procedure as in Preparative Example B-1 except that 71.9 parts of styrene, 23.5 parts of n-butyl acrylate and 4.6 parts of methacrylic acid were used during the preparation of the high molecular weight polymerization solution (H) instead of 75 parts of styrene, 23.5 parts of n-butyl acrylate and 2.5 parts of methacrylic acid. Its property values are summarized in Table 2.

Preparative Example B-12

Resin B-12 was obtained by the same procedure as in Preparative Example B-1 except that 5 parts of the low molecular weight polymerization solution (L1) and 95 parts of the low molecular weight polymerization solution (L2) were used instead of 50 parts of L1 and 50 parts of L2. Its property values are summarized in Table 2.

Preparative Example B-13

Resin B-13 was obtained by the same procedure as in Preparative Example B-1 except that 95 parts of the low molecular weight polymerization solution (L1) and 5 parts of the low molecular weight polymerization solution (L2) were used instead of 50 parts of the low molecular weight polymerization solution (L1) and 50 parts of the low molecular weight polymerization solution (L2). Its property values are summarized in Table 2.

Preparative Example B-14

Resin B-14 was obtained by the same procedure as in Preparative Example B-1 except that 95 parts, instead of 80 parts, of the low molecular weight polymerization solution (L1+L2) comprising a mixture of 50 parts of the low molecular weight polymerization solution (L1) and 50 parts of the low molecular weight polymerization solution (L2), and 5 parts of the high molecular weight polymerization solution (H) were used. Its property values are summarized in Table 2.

Preparative Example B-15

Resin B-15 was obtained by the same procedure as in Preparative Example B-1 except that 60 parts, instead of 80 parts, of the low molecular weight polymerization solution (L1+L2) comprising a mixture of 50 parts of the low molecular weight polymerization solution (L1) and 50 parts of the low molecular weight polymerization solution (L2), and 40 parts of the high molecular weight polymerization solution (H) were used. Its property values are summarized in Table 3.

Preparative Example B-16

Resin B-16 was obtained by the same procedure as in Preparative Example B-1 except that 74 parts of styrene and 26 parts of n-butyl acrylate were used during the preparation of the low molecular weight polymerization solution (L1) instead of 83 parts of styrene and 17 parts of n-butyl acrylate, and that 76 parts of styrene, 23 parts of n-butyl acrylate and 1.0 part of methacrylic acid were used during the preparation of the low molecular weight polymerization solution (L2) instead of 82 parts of styrene, 17 parts of n-butyl acrylate and 1.0 parts of methacrylic acid. Its property values are summarized in Table 3.

Preparative Example B-17

Resin B-17 was obtained by the same procedure as in Preparative Example B-1 except that 94 parts of styrene and 6 parts of n-butyl acrylate were used during the preparation of the low molecular weight polymerization solution (L1) instead of 83 parts of styrene and 17 parts of n-butyl acrylate, and that 93 parts of styrene, 6 parts of n-butyl acrylate and 1.0 part of methacrylic acid were used during the preparation of the low molecular weight polymerization solution (L2) instead of 82 parts of styrene, 17 parts of n-butyl acrylate and 1.0 parts of methacrylic acid. Its property values are summarized in Table 3.

TABLE 3

| | Example 15 | Example 16 | Example 17 | Example 18 | Example 19 | Example 20 | Example 21 |
|---|---|---|---|---|---|---|---|
| Resin A (Crosslinking agent) | A-1 | A-1 | A-1 | A-1 | A-1 | A-2 | A-3 |
| Resin B (Vinyl polymer) | B-15 | B-1 | B-1 | B-16 | B-17 | B-1 | B-1 |
| Mass ratio (B/A) | 93/7 | 98/2 | 85/15 | 93/7 | 93/7 | 93/7 | 93/7 |
| Resin A Epoxy equivalent (g/eq) | 4300 | 4300 | 4300 | 4300 | 4300 | 20000 | 1000 |
| Resin A Weight-average molecular weight | 50000 | 50000 | 50000 | 50000 | 50000 | 50000 | 50000 |
| L1 Weight-average molecular weight | 12000 | 12000 | 12000 | 12000 | 12000 | 12000 | 12000 |
| L1 Functional group Content (mol/kg) | 0 | 0 | 0 | 0 | 0 | 0 | 0 |
| L1 Acid number (mgKOH/g) | 0 | 0 | 0 | 0 | 0 | 0 | 0 |
| L2 Weight-average molecular weight | 12000 | 12000 | 12000 | 12000 | 12000 | 21000 | 12000 |
| L2 Functional group Content (mol/kg) | 0.12 | 0.12 | 0.12 | 0.12 | 0.12 | 0.12 | 0.12 |
| L2 Acid number (mgKOH/g) | 6.5 | 6.5 | 6.5 | 6.5 | 6.5 | 6.5 | 6.5 |
| H Weight-average molecular weight | 300000 | 300000 | 300000 | 300000 | 300000 | 300000 | 300000 |
| H Functional group Content (mol/kg) | 0.29 | 0.29 | 0.29 | 0.29 | 0.29 | 0.29 | 0.29 |
| H Acid number (mgKOH/g) | 16.5 | 16.5 | 16.5 | 16.5 | 16.5 | 16.5 | 16.5 |
| Mass ratio (L1/L2) | 40/40 | 40/40 | 40/40 | 40/40 | 40/40 | 40/40 | 40/40 |
| Mass ratio (H/(L1 + L2)) | 40/60 | 20/80 | 20/80 | 20/80 | 20/80 | 20/80 | 20/80 |
| Gel content (% by mass) | 10 | 1 | 35 | 10 | 10 | 5 | 10 |
| Tg (° C.) | 58 | 58 | 58 | 45 | 75 | 58 | 58 |
| Fixing property | 2 | 1 | 2 | 1 | 2 | 1 | 2 |
| Offset resistance | 1 | 2 | 1 | 1 | 1 | 2 | 1 |
| Blocking resistance | 1 | 1 | 1 | 2 | 1 | 1 | 1 |
| Pulverizability | 2 | 1 | 1 | 1 | 1 | 1 | 1 |
| Development durability | 1 | 1 | 1 | 1 | 1 | 1 | 2 |

Preparative Example B-18

Resin B-18 was obtained by the same procedure as in Preparative Example B-1 except that 0.2 part of di-t-butyl peroxide was used, instead of 0.3 part, per 100 parts of styrene during the preparation of the low molecular weight polymerization solution (L1). Its property values are summarized in Table 4.

Preparative Example B-19

Resin B-19 was obtained by the same procedure as in Preparative Example B-1 except that 82.8 parts of styrene, 17 parts of n-butyl acrylic acid and 0.3 part of methacrylic acid were used instead of 83 parts of styrene and 17 parts of n-butyl acrylate during the preparation of the low molecular weight polymerization solution (L1). Its property values are summarized in Table 4.

Preparative Example B-20

Resin B-20 was obtained by the same procedure as in Preparative Example B-1 except that 0.2 part of di-t-butyl peroxide was used, instead of 0.3 part, per 100 parts of styrene during the preparation of the low molecular weight polymerization solution (L2). Its property values are summarized in Table 4.

Preparative Example B-21

Resin B-21 was obtained by the same procedure as in Preparative Example B-1 except that 82.8 parts of styrene, 17 parts of n-butyl acrylic acid and 0.3 part of methacrylic acid were used instead of 83 parts of styrene and 17 parts of n-butyl acrylate during the preparation of the low molecular weight polymerization solution (L2). Its property values are summarized in Table 4.

TABLE 4

| | Comp. Example 1 | Comp. Example 2 | Comp. Example 3 | Comp. Example 4 | Comp. Example 5 | Comp. Example 6 | Comp. Example 7 |
|---|---|---|---|---|---|---|---|
| Resin A (Crosslinking agent) | A-1 | A-1 | A-1 | A-1 | A-1 | A-1 | A-1 |
| Resin B (Vinyl polymer) | B-18 | B-19 | B-20 | B-21 | B-22 | B-23 | B-24 |
| Mass ratio (B/A) | 93/7 | 93/7 | 93/7 | 93/7 | 93/7 | 93/7 | 93/7 |
| Resin A Epoxy equivalent (g/eq) | 4300 | 4300 | 4300 | 4300 | 4300 | 4300 | 4300 |
| Resin A Weight-average molecular weight | 50000 | 50000 | 50000 | 50000 | 50000 | 50000 | 50000 |
| L1 Weight-average molecular weight | 60000 | 12000 | 12000 | 12000 | 12000 | 12000 | 12000 |
| L1 Functional group Content (mol/kg) | 0 | 0.04 | 0 | 0 | 0 | 0 | 0 |
| L1 Acid number (mgKOH/g) | 0 | 2 | 0 | 0 | 0 | 0 | 0 |
| L2 Weight-average molecular weight | 12000 | 12000 | 60000 | 12000 | 12000 | 12000 | 12000 |
| L2 Functional group Content (mol/kg) | 0.12 | 0.12 | 0.12 | 0.04 | 0.68 | 0.12 | 0.12 |
| L2 Acid number (mgKOH/g) | 6.5 | 6.5 | 6.5 | 2 | 38 | 6.5 | 6.5 |
| H Weight-average molecular weight | 300000 | 300000 | 300000 | 300000 | 300000 | 40000 | 300000 |
| H Functional group Content (mol/kg) | 0.29 | 0.29 | 0.29 | 0.29 | 0.29 | 0.29 | 0.01 |
| H Acid number (mgKOH/g) | 16.5 | 16.5 | 16.5 | 16.5 | 16.5 | 16.5 | 0.5 |
| Mass ratio (L1/L2) | 40/40 | 40/40 | 40/40 | 40/40 | 40/40 | 40/40 | 40/40 |
| Mass ratio (H/(L1 + L2)) | 20/80 | 20/80 | 20/80 | 20/80 | 20/80 | 20/80 | 20/80 |
| Gel content (% by mass) | 10 | 10 | 10 | 10 | 10 | 10 | 10 |
| Tg (° C.) | 58 | 58 | 58 | 58 | 58 | 58 | 58 |
| Fixing property | 3 | 4 | 3 | 1 | 3 | 1 | 1 |
| Offset resistance | 1 | 1 | 1 | 4 | 1 | 4 | 4 |
| Blocking resistance | 1 | 1 | 1 | 1 | 1 | 1 | 1 |
| Pulverizability | 4 | 1 | 4 | 1 | 1 | 1 | 1 |
| Development durability | 1 | 2 | 2 | 1 | 3 | 3 | 1 |

Preparative Example B-22

Resin B-22 was obtained by the same procedure as in Preparative Example B-1 except that 77.8 parts of styrene, 17 parts of n-butyl acrylic acid and 5.2 parts of methacrylic acid were used instead of 83 parts of styrene and 17 parts of n-butyl acrylate during the preparation of the low molecular weight polymerization solution (L2). Its property values are summarized in Table 4.

Preparative Example B-23

Resin B-23 was obtained by the same procedure as in Preparative Example B-1 except that the procedure as described below was used during preparation of the high molecular weight polymerization solution (H). Its property values are summarized in Table 4.

75 parts of xylene was placed in a flask purged with nitrogen and subjected to temperature elevation. Under a reflux of xylene, a previously mixed solution of 75 parts of styrene, 23.5 parts of n-butyl acrylate, 2.5 parts of methacrylic acid and 0.8 part of di-t-butyl peroxide was continuously added over 5 hours, and it was kept under reflux for another 1 hour. The internal temperature was then maintained at 130° C., and then 1,1-bis(t-butylperoxy)-3,3,5-trimethylcyclohexane was further added in an amount of 0.2% by mass of the total amount of styrene, n-butyl acrylate and methacrylic acid, and the mixture was maintained for another 2 hours to continue the reaction. Then, 1,1-bis(t-butylperoxy)-3,3,5-trimethylcyclohexane was further added in an amount of 0.5% by mass of the total amount of styrene, n-butyl acrylate and methacrylic acid, and the mixture was maintained for another 2 hours to complete the reaction.

Preparative Example B-24

Resin B-24 was obtained by the same procedure as in Preparative Example B-1 except that 76.4 parts of styrene, 23.5 parts of n-butyl acrylate and 0.1 part of methacrylic acid were used instead of 75 parts of styrene, 23.5 parts of n-butyl acrylate and 2.5 parts of methacrylic acid during the preparation of the high molecular weight polymerization solution (H). Its property values are summarized in Table 4.

Preparative Example B-25

Resin B-25 was obtained by the same procedure as in Preparative Example B-1 except that 71.1 parts of styrene, 23.5 parts of n-butyl acrylate and 5.4 parts of methacrylic acid were used instead of 75 parts of styrene, 23.5 parts of n-butyl acrylate and 2.5 parts of methacrylic acid during the preparation of the high molecular weight polymerization solution (H). Its property values are summarized in Table 5.

Preparative Example B-26

Resin B-26 was obtained by the same procedure as in Preparative Example B-1 except that 80 parts of a mixture comprising 3 parts of the low molecular weight polymerization solution (L1) and 97 parts of the low molecular weight polymerization solution (L2), and 20 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 5.

Preparative Example B-27

Resin B-27 was obtained by the same procedure as in Preparative Example B-1 except that 80 parts of a mixture comprising 97 parts of the low molecular weight polymerization solution (L1) and 3 parts of the low molecular weight polymerization solution (L2), and 20 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 5.

Preparative Example B-28

Resin B-28 was obtained by the same procedure as in Preparative Example B-1 except that 97 parts of a mixture comprising 40 parts of the low molecular weight polymerization solution (L1) and 40 parts of the low molecular weight polymerization solution (L2), and 3 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 5.

TABLE 5

| | Comp. Example 8 | Comp. Example 9 | Comp. Example 10 | Comp. Example 11 | Comp. Example 12 | Comp. Example 13 | Comp. Example 14 |
|---|---|---|---|---|---|---|---|
| Resin A (Crosslinking agent) | A-1 | A-1 | A-1 | A-1 | A-1 | A-1 | A-1 |
| Resin B (Vinyl polymer) | B-25 | B-26 | B-27 | B-28 | B-29 | B-1 | B-1 |
| Mass ratio (B/A) | 93/7 | 93/7 | 93/7 | 93/7 | 93/7 | 100/0 | 70/30 |
| Resin A Epoxy equivalent (g/eq) | 4300 | 4300 | 4300 | 4300 | 4300 | 4300 | 4300 |
| Resin A Weight-average molecular weight | 50000 | 50000 | 50000 | 50000 | 50000 | 50000 | 50000 |
| L1 Weight-average molecular weight | 12000 | 12000 | 12000 | 12000 | 12000 | 12000 | 12000 |
| L1 Functional group Content (mol/kg) | 0 | 0 | 0 | 0 | 0 | 0 | 0 |
| L1 Acid number (mgKOH/g) | 0 | 0 | 0 | 0 | 0 | 0 | 0 |
| L2 Weight-average molecular weight | 12000 | 12000 | 12000 | 12000 | 12000 | 12000 | 12000 |

TABLE 5-continued

| | Comp. Example 8 | Comp. Example 9 | Comp. Example 10 | Comp. Example 11 | Comp. Example 12 | Comp. Example 13 | Comp. Example 14 |
|---|---|---|---|---|---|---|---|
| L2 Functional group Content (mol/kg) | 0.12 | 0.12 | 0.12 | 0.12 | 0.12 | 0.12 | 0.12 |
| L2 Acid number (mgKOH/g) | 6.5 | 6.5 | 6.5 | 6.5 | 6.5 | 6.5 | 6.5 |
| H Weight-average molecular weight | 300000 | 300000 | 300000 | 300000 | 300000 | 300000 | 300000 |
| H Functional group Content (mol/kg) | 0.62 | 0.29 | 0.29 | 0.29 | 0.29 | 0.29 | 0.29 |
| H Acid number (mgKOH/g) | 35 | 16.5 | 16.5 | 16.5 | 16.5 | 16.5 | 16.5 |
| Mass ratio (L1/L2) | 40/40 | 3/97 | 97/3 | 40/40 | 40/40 | 40/40 | 40/40 |
| Mass ratio (H/(L1 + L2)) | 20/80 | 20/80 | 20/80 | 3/97 | 45/55 | 20/80 | 20/80 |
| Gel content (% by mass) | 10 | 10 | 10 | 10 | 10 | 0 | 55 |
| Tg (° C.) | 58 | 58 | 58 | 58 | 58 | 58 | 58 |
| Fixing property | 2 | 4 | 1 | 1 | 4 | 1 | 4 |
| Offset resistance | 4 | 1 | 4 | 4 | 1 | 4 | 1 |
| Blocking resistance | 1 | 1 | 1 | 1 | 1 | 1 | 1 |
| Pulverizability | 1 | 1 | 1 | 1 | 3 | 1 | 3 |
| Development durability | 3 | 1 | 1 | 1 | 1 | 1 | 1 |

Preparative Example B-29

Resin B-29 was obtained by the same procedure as in Preparative Example B-1 except that 55 parts of a mixture comprising 40 parts of the low molecular weight polymerization solution (L1) and 40 parts of the low molecular weight polymerization solution (L2), and 45 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (L1). Its property values are summarized in Table 5.

Preparative Example B-30

Resin B-30 was obtained by the same procedure as in Preparative Example B-1 except that 72 parts of styrene and 28 parts of n-butyl acrylate were used during the preparation of the low molecular weight polymerization solution (L1) instead of 83 parts of styrene and 17 parts of n-butyl acrylate, and that 71 parts of styrene, 28 parts of n-butyl acrylate and 1.0 part of methacrylic acid were used during the preparation of the low molecular weight polymerization solution (L2) instead of 82 parts of styrene, 17 parts of n-butyl acrylate and 1.0 parts of methacrylic acid. Its property values are summarized in Table 6.

Preparative Example B-31

Resin B-31 was obtained by the same procedure as in Preparative Example B-1 except that 96 parts of styrene and 4 parts of n-butyl acrylate were used during the preparation of the low molecular weight polymerization solution (L1) instead of 83 parts of styrene and 17 parts of n-butyl acrylate, and that 95 parts of styrene, 4 parts of n-butyl acrylate and 1.0 part of methacrylic acid were used during the preparation of the low molecular weight polymerization solution (L2) instead of 82 parts of styrene, 17 parts of n-tyl acrylate and 1.0 parts of methacrylic acid. Its property values are summarized in Table 6.

TABLE 6

| | Comp. Example 15 | Comp. Example 16 | Comp. Example 17 | Comp. Example 18 | Comp. Example 19 | Comp. Example 20 | Comp. Example 21 |
|---|---|---|---|---|---|---|---|
| Resin A (Crosslinking agent) | A-1 | A-1 | A-4 | A-5 | A-1 | A-1 | A-1 |
| Resin B (Vinyl polymer) | B-30 | B-31 | B-1 | B-1 | B-32 | B-33 | B-34 |
| Mass ratio (B/A) | 93/7 | 93/7 | 93/7 | 93/7 | 93/7 | 93/7 | 93/7 |
| Resin A Epoxy equivalent (g/eq) | 4300 | 4300 | 666 | 33333 | 4300 | 4300 | 4300 |
| Resin A Weight-average molecular weight | 50000 | 50000 | 50000 | 50000 | 50000 | 50000 | 50000 |

TABLE 6-continued

| | Comp. Example 15 | Comp. Example 16 | Comp. Example 17 | Comp. Example 18 | Comp. Example 19 | Comp. Example 20 | Comp. Example 21 |
|---|---|---|---|---|---|---|---|
| L1 Weight-average molecular weight | 12000 | 12000 | 12000 | 12000 | 12000 | — | — |
| L1 Functional group Content (mol/kg) | 0 | 0 | 0 | 0 | 0 | — | — |
| L1 Acid number (mgKOH/g) | 0 | 0 | 0 | 0 | 0 | — | — |
| L2 Weight-average molecular weight | 12000 | 12000 | 12000 | 12000 | — | 12000 | 12000 |
| L2 Functional group Content (mol/kg) | 0.12 | 0.12 | 0.12 | 0.12 | — | 0.12 | 0.06 |
| L2 Acid number (mgKOH/g) | 6.5 | 6.5 | 6.5 | 6.5 | — | 6.5 | 3.25 |
| H Weight-average molecular weight | 300000 | 300000 | 300000 | 300000 | 300000 | 300000 | 300000 |
| H Functional group Content (mol/kg) | 0.29 | 0.29 | 0.29 | 0.29 | 0.29 | 0.29 | 0.29 |
| H Acid number (mgKOH/g) | 16.5 | 16.5 | 16.5 | 16.5 | 16.5 | 16.5 | 16.5 |
| Mass ratio (L1/L2) | 40/40 | 40/40 | 40/40 | 40/40 | 100/0 | 0/100 | 0/100 |
| Mass ratio (H/(L1 + L2)) | 20/80 | 20/80 | 20/80 | 20/80 | 20/80 | 20/80 | 20/80 |
| Gel content (% by mass) | 10 | 10 | 10 | 10 | 10 | 10 | 10 |
| Tg (° C.) | 43 | 78 | 58 | 58 | 58 | 58 | 58 |
| Fixing property | 1 | 4 | 1 | 4 | 1 | 3 | 2 |
| Offset resistance | 1 | 1 | 4 | 1 | 4 | 1 | 4 |
| Blocking resistance | 4 | 1 | 1 | 1 | 1 | 1 | 1 |
| Pulverizability | 1 | 3 | 1 | 1 | 1 | 1 | 1 |
| Development durability | 1 | 1 | 1 | 3 | 1 | 1 | 1 |

Preparative Example B-32

Resin B-32 was obtained by the same procedure as in Preparative Example B-1 except that 80 parts of the low molecular weight polymerization solution (L1) and 20 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 6.

Preparative Example B-33

Resin B-33 was obtained by the same procedure as in Preparative Example B-1 except that 80 parts of the low molecular weight polymerization solution (L2) and 20 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 6.

Preparative Example B-34

Resin B-34 was obtained by the same procedure as in Preparative Example B-1 except that 82.5 parts of styrene, 17 parts of n-butyl acrylate and 0.5 part of methacrylic acid were used during the preparation of the low molecular weight polymerization solution (L2) instead of 83 parts of styrene and 17 parts of n-butyl acrylate, and that 80 parts of the low molecular weight polymerization solution (L2) and 20 parts of the high molecular weight polymerization solution (H) were used instead of 40 parts of the low molecular weight polymerization solution (L1), 40 parts of the low molecular weight polymerization solution (L2) and 20 parts of the high molecular weight polymerization solution (H). Its property values are summarized in Table 6.

Binder resins for toner were prepared using the above-mentioned resins, and the content of the gel component and Tg were measured. Further, toners were prepared using the corresponding binder resins for toner and were evaluated as follows. The results are presented in Tables 1 to 6.

1) Fixing Property

Copying was performed at a copying rate of 72 sheets/min by changing the temperature of the fixing roller by 5° C. each time. After a sand eraser (plastic sand eraser product of Tombow Pencils Co., "MONO") was moved back and fro 10 times with a load of 1 kg between the copied solid black parts and the white paper parts, the degree of blackness of the solid black parts was measured with an ink densitometer, and the proportion of residual toner was represented by the ratio of ink density, evaluated by means of the lowest temperature at which at least 60% of the ink remains.

1: not higher than 150° C.

2: higher than 150° C. and up to 160° C.

3: higher than 160° C. and up to 170° C.

4: higher than 170° C.

2) Offset Resistance

The temperature at which the offset phenomenon takes place during copying is indicated as measured.

1: not lower than 230° C.

2: not lower than 220° C. and below 230° C.

3: not lower than 210° C. and below 220° C.

4: below 210° C.

3) Blocking Property

After a toner was kept in an environment at a temperature of 50° C. and relative humidity of 50% for 1 week, it was visually observed for the degree of cohesion of the powders for an evaluation as follows.

1: No cohesion

2: Slight cohesion, but upon shaking the container gently, dispersed again

3: Some cohesion products not easily dispersed upon shaking of the container well 4: Complete cohesion into a single mass 4) Pulverizability During preparation of a toner, a portion of those which was subjected to double-screw kneading and cooling was sampled and pulverized, and then the product was again pulverized homogeneously with a jet mill to a particle size of 10 mesh under and 16 mesh on. The particle size distribution was measured with a Coulter counter to obtain the proportion of the particle size in the range of 5 to 20 μm.

1: at least 85%

2: 70 to 85%

3: 50 to 70%

4: 50% or below

5) Development Durability

After copying was continuously performed for 10,000 sheets with a commercially available high-speed copier machine (at a copying rate of 72 sheets/min) using the above-mentioned toners, the reproducibility was checked by copying an original sheet having lines with a width of 100 μm. For the original sheet, the line width was measured, in advance on the sheet of paper, at 5 points by observing through a microscope. This original sheet was copied, and after fixing, the copy sheet was likewise taken for the measurement of line width at 5 points. Taking the average value of the line widths from the original sheet and copy sheet, respectively, the difference in the line width between the original sheet and of the copy sheet was evaluated as follows.

Increment of line width δ=line width of the copy paper—line width of the original paper 1: $\delta<5$ μm 2: $5\leqq\delta<10$ μm 3: $\delta\geqq10$ μm

Example 1

Seven parts of resin A-1 and 93 parts of resin B-1 were mixed in a Henschel mixer, and then the mixture was kneaded and reacted in a double-screw kneader (KEXN S-40 type, product of Kurimoto, Ltd.) at a resin temperature of 185° C. at the outlet of the double-screw kneader with the residence time of 90 seconds. Then, the resulting product was cooled and pulverized to be used as a binder for toner. For the cooling method, the resulting product was rapidly cooled using a steel belt cooler, at a cooling water temperature of 10° C., with the amount of cooling water being 20 liters per kg of resin, the heat conductivity of the equipment being 0.08 kcal/mhrs. The conditions for preparation and the property values of the obtained-resin are summarized in Table 1. Then, 8 parts of carbon black MA100 (product of Mitsubishi Kasei), 5 parts of polypropylene wax (Biscol 550P) and 1 part of Aizen Spilon Black TRH as a charge controlling agent were added, the whole mixture was mixed again in a Henschel mixer and then was kneaded in a double-screw kneader (PCM-30 type, product of Ikegai Machinery Co.) at a resin temperature of 150° C. at the outlet of the double-screw kneader with the residence time of 30 seconds. The resulting product was subsequently cooled, pulverized and classified to yield a toner of about 7 microns. This cooling process was performed by the same rapid cooling method as described above. Mixing 3 parts of this toner and 97 parts of a carrier yielded a developing agent, and images were recorded by means of a remodeled a commercially available high-speed copier machine. The results of the evaluation are presented in Table 1.

Examples 2 to 21 and Comparative Examples 1 to 21

Preparation of toners and evaluation thereof were carried out in the same manner as in Example 1, except that the conditions were varied as described in Tables 1 to 6.

The results are presented in Tables 1 to 6.

The results of the Examples are presented in Tables 1 to 3, while the results of the Comparative Examples are presented in Tables 4 to 6. A binder resin for toner and a toner having a specific gel content and glass transition temperature, can be obtained from the three types of vinyl polymers (L1), (L2) and (H), which satisfy a specific molecular weight, a specific content of functional groups and a specific proportion by mass, and a crosslinking agent with a specific content of a functional group. This binder resin for toner and the toner are excellent in the low temperature fixing property as well as in the offset resistance. Moreover, the toner binder of the present invention has good blocking resistance, pulverizability and development durability.

The invention claimed is:

1. A binder resin for a toner obtained by crosslinking a vinyl polymer (B) satisfying the following requirements (I) to (VI) with a crosslinking agent (A) having an epoxy equivalent of 1,000 to 30,000, said binder resin containing 0.1 to 50% by mass of a gel component, and having a glass transition temperature of 45 to 75° C.:

(I) vinyl polymer (B) comprises vinyl polymer (H) and vinyl polymer (L);

(II) vinyl polymer (L) comprises vinyl polymer (L1) which has a weight-average molecular weight in the range between 4,000 and 50,000, as measured by gel permeation chromatography (GPC) and contains 0 to 0.02 mol of a functional group selected from OH, COOH, acid anhydride and amino per kg of the resin, and vinyl polymer (L2) which has a weight-average molecular weight in the range between 4,000 and 50,000 and contains 0.05 to 0.65 mol of a functional group selected from OH, COOH, acid anhydride and amino per kg of the resin;

(III) vinyl polymer (H) has a weight-average molecular weight in the range between 50,000 and 1,000,000 and contains 0.02 to 0.60 mol of a functional group selected from OH, COOH, acid anhydride and amino per kg of the resin;

(IV) the mass ratio of vinyl polymer (L1)/vinyl polymer (L2) is 5/95 to 95/5;

(V) the mass ratio of vinyl polymer (H)/vinyl polymer (L) is 5/95 to 40/60; and (VI) the molecular weight and/or the content of the functional group of vinyl polymer (H) is (are) different from those of vinyl polymer (L1) and of vinyl polymer (L2).

2. The binder resin for toner according to claim 1, wherein the vinyl polymer (B) is a styrene-acrylic resin.

3. A toner containing the binder resin for a toner according to claim 1.

* * * * *